(12) United States Patent
Bernasconi

(10) Patent No.: US 7,441,312 B2
(45) Date of Patent: Oct. 28, 2008

(54) SEALING SLIDE FASTENER WITH TEETH WELDED ONTO THE TAPES WHICH THEY JOIN

(75) Inventor: Sergio Bernasconi, Morbio Inferiore (CH)

(73) Assignee: Riri Group S.A., Mendrisio (IT)

( * ) Notice: Subject to any disclaimer, the term of this patent is extended or adjusted under 35 U.S.C. 154(b) by 13 days.

(21) Appl. No.: 11/702,551

(22) Filed: Feb. 6, 2007

(65) Prior Publication Data

US 2007/0163091 A1    Jul. 19, 2007

Related U.S. Application Data

(62) Division of application No. 10/182,893, filed as application No. PCT/IB00/00935 on Jul. 11, 2000, now abandoned.

(51) Int. Cl.
*A44B 19/32* (2006.01)

(52) U.S. Cl. .......................................... 24/389; 24/403

(58) Field of Classification Search ................... 24/384, 24/389, 434, 435, 436, 398
See application file for complete search history.

(56) References Cited

U.S. PATENT DOCUMENTS

| | | | |
|---|---|---|---|
| 2,910,754 A * | 11/1959 | Morin | ........................ 24/384 |
| 3,490,109 A | 1/1970 | Heimberger | |
| 3,490,970 A | 1/1970 | Heimberger | |
| 3,501,816 A | 3/1970 | Heimberger | |
| 3,821,054 A | 6/1974 | Trostyanskaya et al. | |
| 4,312,102 A | 1/1982 | Fukuroi | |
| 4,349,943 A | 9/1982 | Moertel | |
| 4,380,098 A | 4/1983 | Fukuroi | |
| 4,402,115 A * | 9/1983 | Moertel | ........................ 24/410 |
| 4,718,150 A | 1/1988 | Moertel | |
| 4,765,038 A * | 8/1988 | Kasai | ........................... 24/389 |
| 5,231,737 A * | 8/1993 | Frohlich et al. | ............... 24/434 |
| 6,092,267 A * | 7/2000 | Covi et al. | ..................... 24/410 |

FOREIGN PATENT DOCUMENTS

| | | |
|---|---|---|
| EP | 0 108 214 | 5/1984 |
| EP | 0 350 651 | 1/1990 |
| EP | 0 632 974 | 1/1995 |
| EP | 0 900 532 A | 3/1999 |
| JP | 2000-184552 | 6/2000 |

OTHER PUBLICATIONS

"Product and Application Guide of Hytrel Polyester Elastomer" of Du Pont-Toray Co., Ltd., Jul. 1998, pp. 1-22.
Extract from "Rubber Industry Guide", 1994, pp. 128-138 (translation included).

* cited by examiner

*Primary Examiner*—Jack W. Lavinder
(74) *Attorney, Agent, or Firm*—Young & Thompson

(57) ABSTRACT

A description is given of a sealing slide fastener (10), comprising two tapes (1, 2) of elastic material with their edges (1b, 2b) facing each other, which are pressed against each other by the coupling of two sets of aligned teeth (3, 4) caused by the passage of a closing slider (8), in which at least the outer layers (1e, 2e) of the said two tapes (1, 2) and the said teeth (3, 4) are made from materials which can be welded together chemically.

9 Claims, 4 Drawing Sheets

SEALING SLIDE FASTENER WITH TEETH WELDED ONTO THE TAPES WHICH THEY JOIN

BACKGROUND OF THE INVENTION

The present invention relates to the technical field of sealing slide fasteners, in other words those made in such a way as to prevent the passage of fluids, even if put under pressure within predetermined limits.

A fastener of this type, as is known, comprises two tapes of elastic material with their edges facing each other, which are pressed together in such a way as to make them provide the desired seal as a result of the coupling of two sets of aligned teeth caused by the passage of a closing slider.

These teeth are fixed to the tapes by various systems, of which one, for example, is described in the patent U.S. Pat. No. 2,910,745, and another is described in the patent GB-A-2,047,334.

The latter document describes the system most commonly used in the present state of the art to fix the said teeth on the tapes which they are to join, this system consisting in forming the teeth in two halves, interposing between them the edges of the tapes which are to be joined, and joining the said two halves together and to the tapes by mechanical connecting means which perforate the tapes.

This solution is complicated and expensive to implement, and cannot guarantee an effective tightness of the slide fastener, since a liquid, whether under pressure or not, can easily infiltrate through the holes through which the mechanical connecting means—usually male/female connectors—pass.

SUMMARY OF THE INVENTION

The inventor of the present invention has devised a sealing slide fastener which avoids the drawbacks described above, by virtue of the fact that the teeth and the tapes which they join are made from materials which can be welded together chemically in such a way that, when the teeth are formed by injection-moulding in position on their respective tapes, they are welded by chemical bonding to the tapes without leaving pores or holes through which water can penetrate.

To facilitate the construction of a fastener according to the invention, the inventor has also provided for the forming of a through hole in each tape at the position of each tooth, in such a way as to permit the passage of the injection-moulded material through the hole and to enable the two halves of a tooth located on opposite sides of the tape to be formed in a single injection-moulding operation and with simplified equipment.

The object of the present invention is a sealing slide fastener as described in the precharacterizing clause of the attached Claim 1, characterized by what is disclosed in the characterizing part of the said claim.

A more detailed description will now be given of some examples of embodiment of the sealing slide fastener according to the invention, these examples not being restrictive or limiting with respect to other different embodiments which can be devised by a person skilled in the art on the basis of the teachings contained in the aforesaid claim 1.

BRIEF DESCRIPTION OF THE DRAWINGS

In the course of the aforesaid description, reference will also be made to the attached drawings, which show.

DESCRIPTION OF THE PREFERRED EMBODIMENTS

Figure 1:
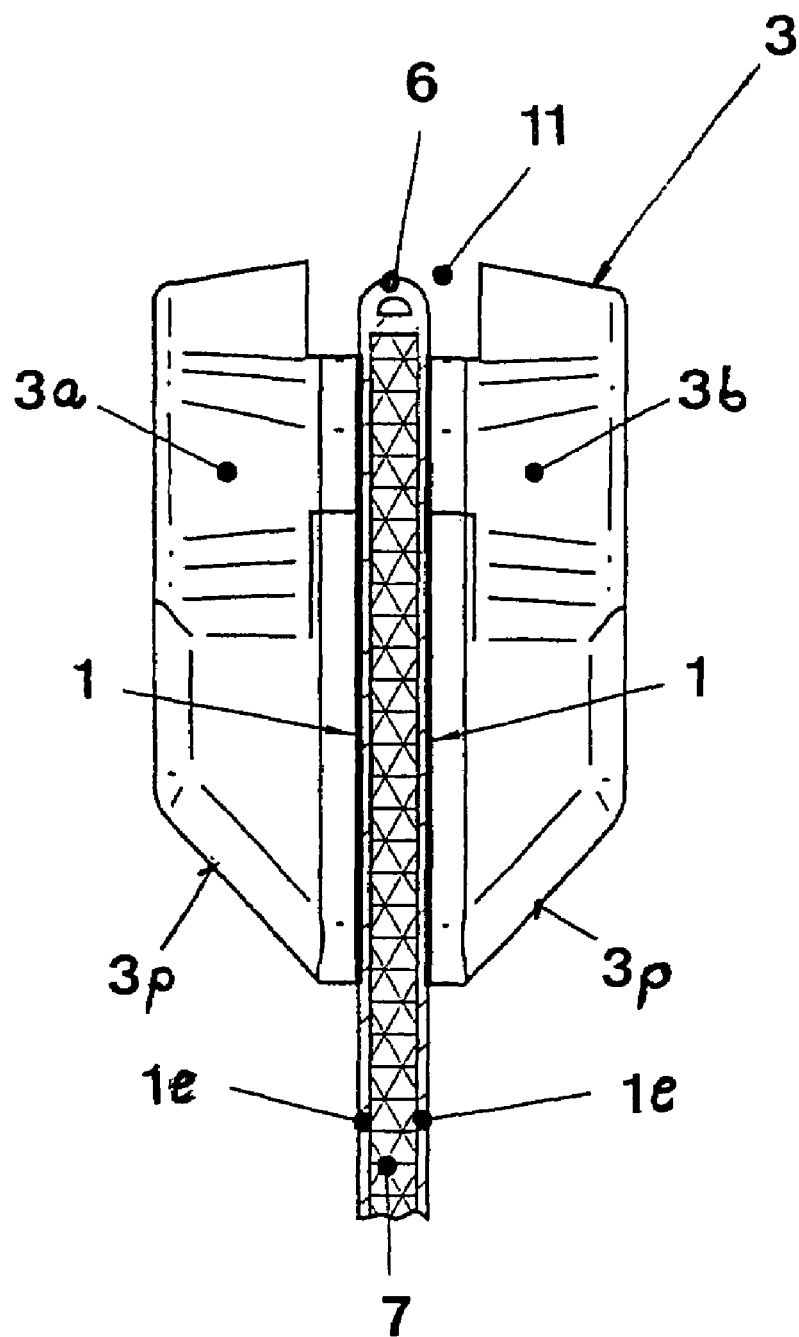
in FIG. 1, the longitudinal section of a tape to which two halves of a tooth are applied in a fastener according to the invention.
Figure 3:
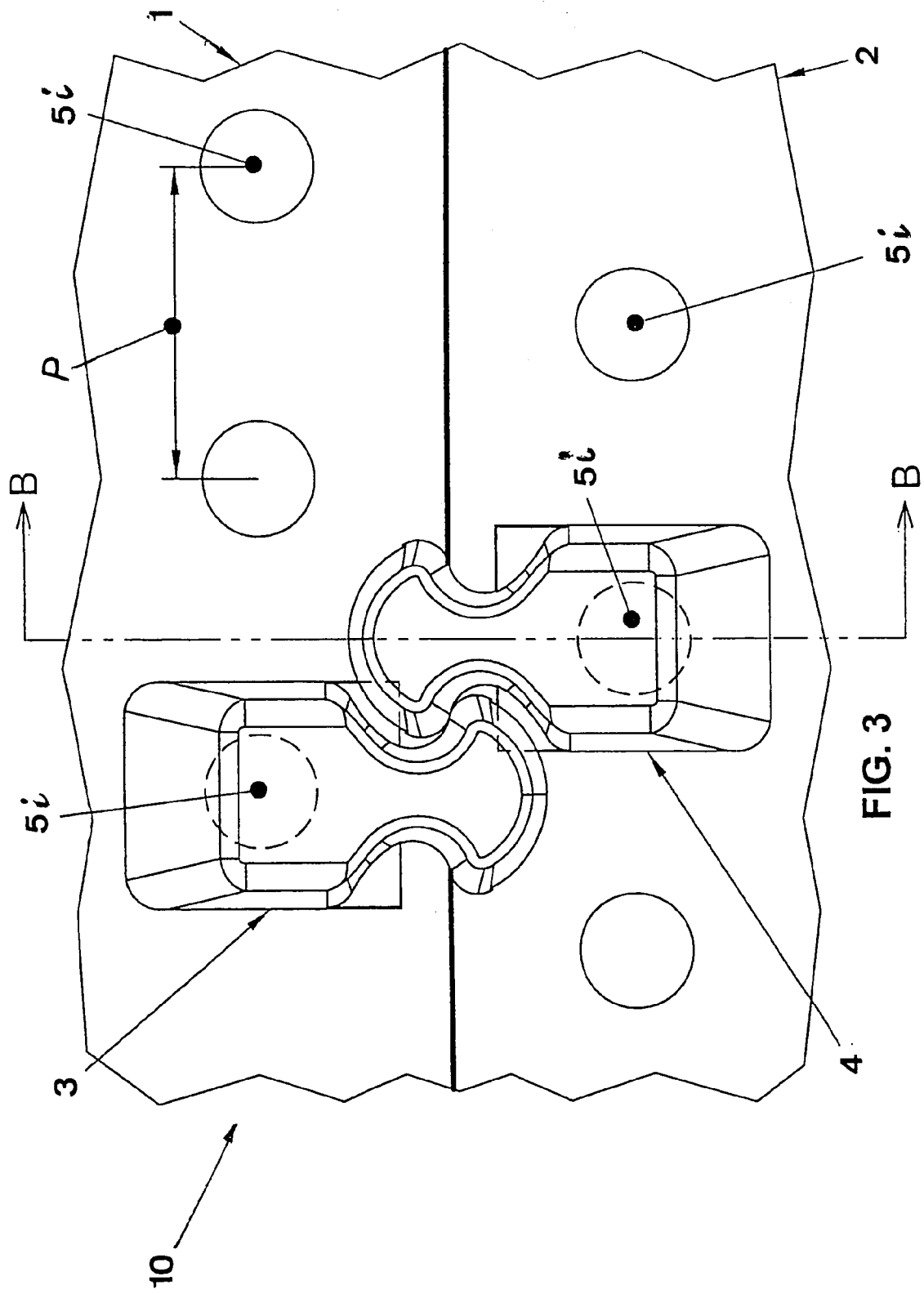
in FIG. 3, the plan view of two tapes connected by two teeth in a sealing slide fastener according to the invention in which the tapes have holes in the area in which they are enclosed between the two halves of a tooth.

If FIGS. 1 and 3 are consulted initially, it can be seen in these that a sealing slide fastener 10 (FIG. 3) according to the invention consists of two tapes 1, 2 joined together by two sets of aligned teeth 3, 4 (the figures show only one pair of these).

Figure 2:
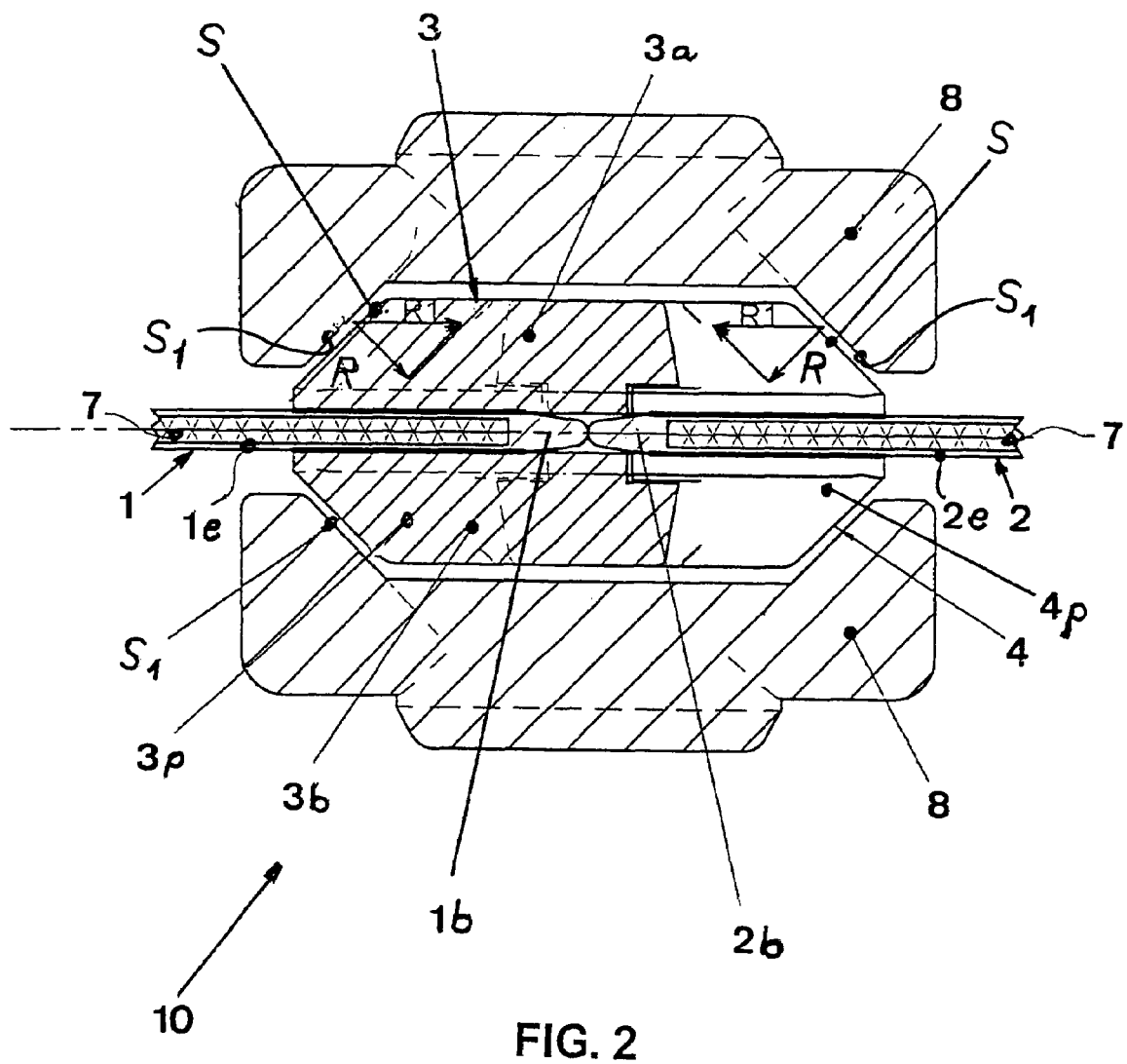
in FIG. 2, the longitudinal section of two tapes connected by teeth at the moment in which they are joined by a closing slider.

The teeth 3, 4 are applied along the facing edges of the said two tapes 1, 2, which press against each other as a result of the passage of a slider 8 (see FIG. 2) of a known type for the closing and opening of fasteners.

Figure 4:
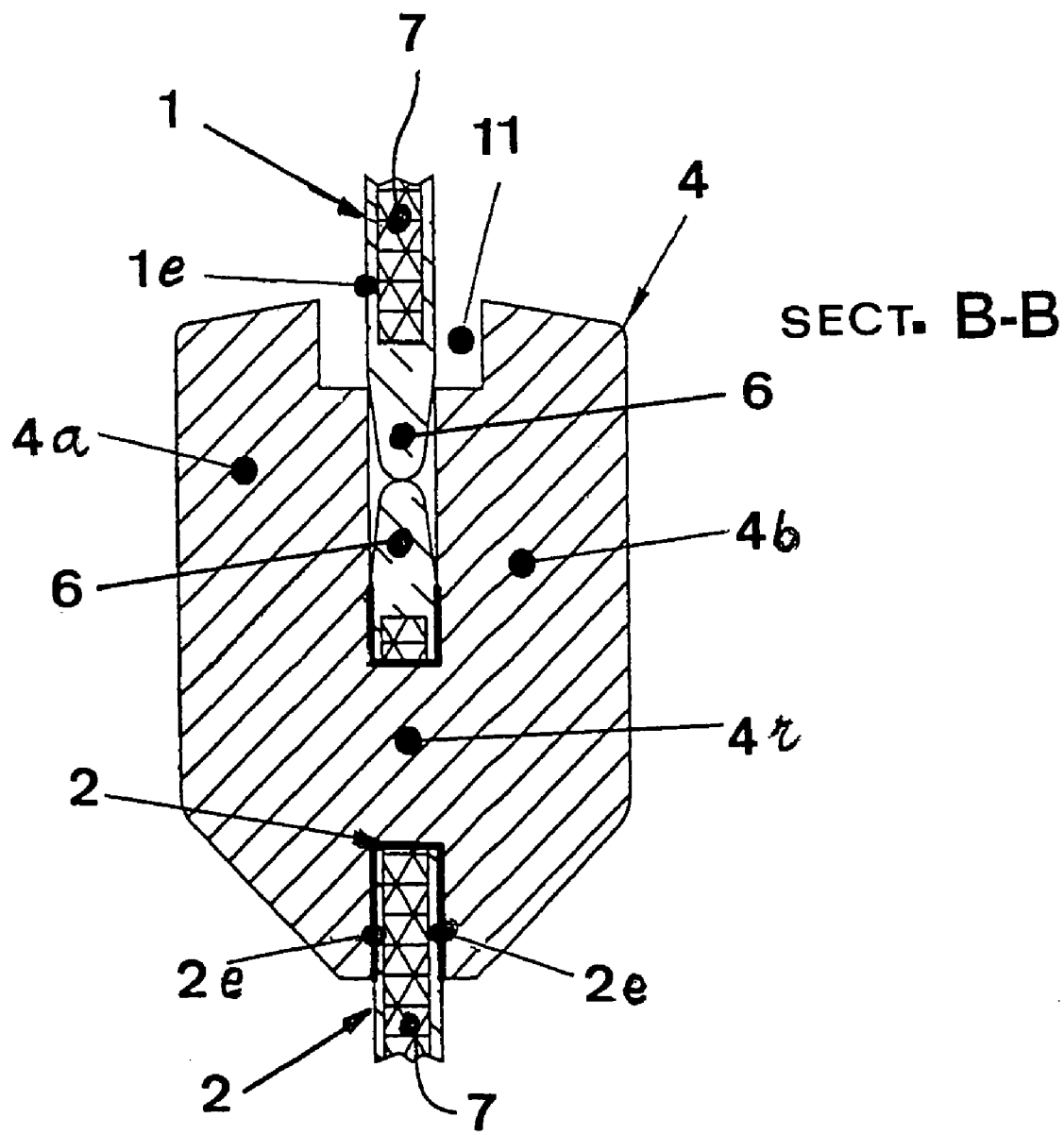
in FIG. 4, the longitudinal section of a tooth and of parts of the tapes in the configuration shown in FIG. 3.

The said tapes 1, 2, as more clearly visible in FIG. 4, consist of two outer layers 1e, 2e which are convergent and terminate in a sealing bead 6 on their facing edges which are pressed by the aforesaid teeth 3, 4, and a reinforcing layer 7 interposed within these layers.

The said outer layers 1e, 2e, and consequently the respective sealing beads 6, are made, in the fastener 1 according to the invention, from a thermoplastic elastomeric material.

The teeth 3, 4, one of each of which is visible in FIG. 1 and in FIG. 4 respectively, are formed in two halves 3a, 3b, 4a, 4b which are applied to the opposite faces of the edges of the said tapes 1, 2, and are made from a synthetic resin, chosen for example from a group comprising polypropylene (PP), polycarbonate (PC), polyethylene terephthalate (PET), polybutylene (PBT), polyvinyl chloride (PVC), polyamide (PA) and polystyrene (PS, obviously of the high density type).

The teeth 3, 4, which are formed by the known method of injection moulding, adhere by chemical bonding, at the moment of their forming, to the said tapes 1, 2, remaining securely fixed to these and without generating possible pores or holes through which a liquid, whether under pressure or not, can infiltrate.

This is because this result is achieved, as mentioned above, by the fact that the materials used to make the teeth 3, 4 and at least the outer layers 1e, 2e of the tapes 1, 2 can be welded together chemically.

This is the fundamental requirement of the sealing slide fastener 1 according to the invention, and materials other than those listed above can also be used to meet this requirement.

To facilitate the injection-moulding process for forming the teeth 3, 4, while simultaneously connecting together the two facing halves 3a, 3b and 4a, 4b, the inventor has provided for the formation, in each area of the tapes 1, 2 which is enclosed between the two halves of a tooth 3, 4, of a hole 5i (see FIGS. 3, 4) which can permit the passage of the injection-moulded material forming the tooth in question. (The distance P between two holes 5i is equal to the pitch of the teeth.)

Thus a secure and reliable interconnection of the two halves 4a, 4b of a tooth 4 is achieved by means of a connecting neck 4r, making the tooth capable of withstanding the repeated stresses of the closing and opening of the fastener 1.

Above all, when the above procedure is followed, the operation of injection-moulding a tooth becomes simpler, the two halves of the tooth being injection-moulded in a single operation carried out with simpler and less expensive equipment.

To decrease the force required to close a fastener or to close a sealing slide fastener 10 according to the invention, the inventor has provided (see in particular FIG. 2) for the shaping of the rear part 3p, 4p of each tooth 3, 4 in such a way that it comprises a surface S inclined at an angle α with respect to the tape (1, 2) to which each tooth is applied.

The construction of the corresponding closing slider 8, in such a way that it presses against this surface S with a bearing surface $S_1$ parallel to it, enables the user to act with a less intense force R, amplified by an inclined plane effect, in order to exert a force $R_1$ capable of compressing the said beads 6 of the tapes 1, 2 during the closing of the fastener 10.

To conclude the present description, the inventor recommends the forming of a cavity 11, designed so that it can contain the beads 6 when they are partially deformed by compression in order to create the desired seal, in each tooth 3, 4, in the proximity of the corresponding bead 6.

The invention claimed is:

1. A sealing slide fastener (10), comprising:
a closing slider (8);
two tapes (1, 2) of elastic material having respective edges (1b, 2b) facing each other, each of said two tapes carrying a respective set of injection molded teeth (3, 4), said edges being pressed against each other by coupling of said sets of teeth caused by passage of said closing slider;
each of said two tapes having two outer layers (1e, 2e) of thermoplastic material and an inner reinforcing layer (7) between said two outer layers; and
each of said teeth having two halves (3a, 3b, 4a, 4b) that are each injection molded directly on a respective one of said outer layers without an intervening adhesive layer and that are chemically welded directly to the respective one of said outer layers without an adhesive.

2. The fastener according to claim 1, in which said teeth are made of a material chosen from a group consisting of polypropylene, polycarbonate, polyethylene terephthalate, polybutylene, polyvinyl chloride, polyamide, and polystyrene, and in which said outer layers are made of a thermoplastic elastomer that is welded chemically to said material.

3. The fastener according to claim 1, in which each of said tapes has, between said two halves of each of said teeth, a through-hole (5i) filled with the material forming said teeth.

4. The fastener according to claim 1, in which a rear part (3p, 4p) of said two halves of each of said teeth comprises a surface (S) inclined at an angle (α) to said tape and on which said closing slider acts with a bearing surface ($S_1$) parallel to said surface.

5. The fastener according to claim 1, in which said outer layers of each of said tapes form a sealing bead (6) on the edge which faces and is pressed against the edge of the other of said two tapes.

6. The fastener according to claim 1, in which said reinforcing layer consists of a tape of textile material.

7. The fastener according to claim 1, in which said reinforcing layer consists of a set of threads of a material having high resistance to bending and traction.

8. The fastener according to claim 1, in which said reinforcing layer consists of a lattice of plastic material bonded to said outer layers.

9. The fastener according to claim 1, in which said reinforcing layer consists of a strip of plastic material bonded to said outer layers.

* * * * *